United States Patent [19]

Cole

[11] 4,366,528
[45] Dec. 28, 1982

[54] SWITCHBOARD HOUSING APPARATUS

[75] Inventor: David B. Cole, Ballwin, Mo.

[73] Assignee: GTE Products Corporation, Stamford, Conn.

[21] Appl. No.: 219,551

[22] Filed: Dec. 23, 1980

[51] Int. Cl.³ .............................................. H02B 1/20
[52] U.S. Cl. ................................ 361/429; 174/133 B; 174/171; 361/355; 361/361; 361/379
[58] Field of Search ................. 174/70 B, 71 B, 68 B, 174/72 B, 133 B, 171; 361/331, 346, 355, 356, 358, 361, 378, 379, 429

[56] References Cited

U.S. PATENT DOCUMENTS

| | | | |
|---|---|---|---|
| 3,553,534 | 1/1971 | Bould | 361/361 |
| 3,655,907 | 4/1972 | Philibert | 174/77 R |
| 3,780,355 | 12/1973 | Salvati | 174/72 B |
| 3,786,313 | 1/1974 | Coles | 174/171 |
| 3,793,564 | 2/1974 | Salvati | 174/68 B |
| 3,840,785 | 10/1974 | Olashaw | 174/99 B |
| 3,873,885 | 3/1975 | Elfverson | 339/96 |
| 3,924,161 | 12/1975 | Olashaw | 174/71 B |
| 3,961,129 | 6/1976 | Gehrs | 174/72 B |
| 3,995,103 | 11/1976 | Gehrs | 174/72 B |
| 4,114,336 | 9/1978 | Becket | 52/280 |

Primary Examiner—G. P. Tolin
Attorney, Agent, or Firm—Fred Fisher

[57] ABSTRACT

Lower extremities of two structural, component-carrying columns are affixed to two channel members that are coupled to a base frame. The columns, members, and frame form a free standing assembly. Two other channel members, coupled to a top frame, are affixed to the columns' upper extremities. Corner posts couple the top and bottom frames.

A bus bar is supported within frames and corner posts by an insulated elongated steel member having a through bolt hole. Two insulating washers seat within the hole at opposite sides thereof. A metal bolt fits within the washers and hole. A nut engages with the bolt. A flat washer fits between the bolt and one washer.

A plurality of bus bars carry and distribute current at a particular voltage at a first phase. A similar plurality carry and distribute current at other phases. All bus bars are oriented parallel to one another spaced interjacently: first phase, second phase, third phase, first phase, second phase, etc.

A distribution bus bar having a uniform cross-section in planes containing width and height rectangular coordinates are formed with a groove along two opposite sides thereof extending along its substantially greater length. Each groove can retain a carriage bolt that can be slid therealong. Two remaining opposing sides of the distribution bus bar are formed with longitudinally extending crevices, and intermediate and side longitudinal ridges, that provide for rigidity of the distribution bus bar during short circuit, a convenient extrusion shape for manufacture, and efficient heat sink.

1 Claim, 5 Drawing Figures

SWITCHBOARD HOUSING APPARATUS

BACKGROUND OF THE INVENTION

1. Field of the Invention

This invention relates to new and improved switchboard apparatus, and, in particular, to switchboard housing apparatus. Accordingly, it is a general object of this invention to provide new and improved apparatus of such character.

2. Description of the Prior Art

In the past, a cubicle of iron or steel was built that was rigid and free-standing. Switchgear equipment would be bolted or welded to the sides of the cubicle for support. In some prior art switchboards, the bulk of unit, including operational portions, is supported by the sides of a frame. Both the left and right hand sides of the frame act as covers and as support members for the switchgear.

In the past, insulative supports were used to support a plurality of bus bars.

In the past, it was common to have bus bars of the same phase sandwiched together in close proximity to each other, but spaced apart. Disadvantageously however, three such bars would not carry thrice as much current as one bar because, at high amperage ratings, such as 1000 or 2000 amperes at 60 cycles, due to the skin effect, electrons would tend to flow along the outer surface. Thus, with three bars in parallel, the current would tend to be carried primarily by the outer two bars and not by the inner bar. Distribution bus bars of the prior art usually suffered from one or more disadvantages. Prior art bus bars may have had a disadvantage of lacking the ability to greatly dissipate heat, or lacking the accommodation of permitting a bolt to slide along a grooveway therein. In the event of short circuits, prior bus bars may have had the tendency to bend or whip around in an uncontrolled manner upon the passage of high amounts of current.

SUMMARY OF THE INVENTION

Another object of this invention is to provide a new and improved switchboard which utilizes less materials than those of the prior art.

Yet another object of this invention is to provide a new and improved switchboard housing in which a center post, or a pair of center posts, are used as the load bearing member or members for various components of the switchboard. The outer housing, including covers, is utilized solely to prevent an individual from putting his hand inside the unit and touching the live elements therein. The side covers and side panels of this invention are not used for support.

Still yet another object of this invention is to provide a new and improved switchboard housing utilizing a bus bar support which is stronger and less expensive than bus bar supports of the prior art.

Still yet another object of this invention is to provide for a new and improved switchboard housing including a bus distribution arrangement for horizontal bus bars which would carry more current than other bus bars of the prior art.

Still yet another object of this invention is to provide for a new and improved switchboard housing in which an improved bus distribution arrangement for horizontal bus bars provides for the reduction of the proximity effect of bus bars in the same phase.

Another object of this invention is to provide for a new and improved switchboard housing in which a novel bus distribution arrangement for horizontal bus bars enables the short circuit capability to be increased due to the separation of bars in each phase.

Still yet a further object of this invention is to provide for a new and improved switchboard housing utilizing an extrusion designed for distribution bus bars which provide for simplified mounting, rigidity of shape under lateral short circuit forces, high efficiency cooling, an economical shape for extrusion, and provides for reduction of interphase spacing of conductors.

In accordance with an embodiment of the invention, a switchboard housing apparatus includes a pair of vertically oriented structural support columns, each of which is adapted to support and carry a plurality of components thereon. A first pair of channel members are respectively affixed to the lower extremities of the columns. A base frame is coupled to the first pair of members so that the columns, the members, and the frame form a completely free-standing assembly. A second pair of channel members are respectively affixed to the upper extremities of the columns, and a top frame is coupled to the second pair of members. Corner posts are coupled to the top and bottom frames. Means are provided within the frames and the corner posts for supporting a bus bar. Such means include an elongated steel member having at least one bolt hole therethrough. The steel member is coated with an insulative material. A first formed washer of insulative material is adapted to seat within the hole at one side of the steel member, and a second formed washer of insulative material is adapted to seat within the hole at a side opposite thereof. A metal bolt fits within the washers in the hole. A nut engages with the bolt, with a flat washer adapted to fit between the nut and the second formed washer. A bus distribution arrangement for bus bars includes a plurality of bus bars for carrying and distributing current at a particular voltage at a first phase. A like plurality of bus bars carries and distributes current at the particular voltage at a second phase. Similarly, a like plurality of bus bars carries and distributes current at the particular voltage at a third phase. All the bus bars are oriented parallel to one another. The bus bars are spaced in an interjacent manner, such as first phase, second phase, third phase, first phase, second phase, etc. A distribution bus has a length substantially greater than its either two rectangular coordinates. The distribution bus bar has a uniform cross-section in planes containing the other two rectangular coordinates. The distribution bus bar is formed with a first groove along one side thereof extending along its length. The distribution bus bar is formed with a second groove along a second side, opposite to the first side thereof, which extends along the length of the distribution bus bar. Each of the grooves is formed so that a carriage bolt, or a hexagon bolt with a flat washer, can be retained by the bar while permitting the bolt to be slid along its retaining groove. The opposite sides of the distribution bus bar, interjacent to the grooves, are each formed with a pair of longitudinally extending crevices and intermediate and side longitudinal ridges, whereby the formed crevices and the formed ridges provide for great rigidity of the distribution bus bar during a short circuit condition, while providing for a convenient shape to manufacture by way of extrusion, while further providing for an efficient heat sink.

A second pair of channel members are respectively affixed to the upper extremities of the columns. A top frame is coupled to the second pair of members. Corner posts are coupled to the top and bottom frames. In accordance with certain features of the invention, the corner posts provide means for mounting covers and at least one door over the front, back and side as desired.

BRIEF DESCRIPTION OF THE DRAWINGS

Other objects, advantages and features of this invention, together with its construction and mode of operation, will become more apparent from the following description, when read in conjunction with the accompanying drawing, in which.

DESCRIPTION OF PREFERRED EMBODIMENTS

Figure 1:
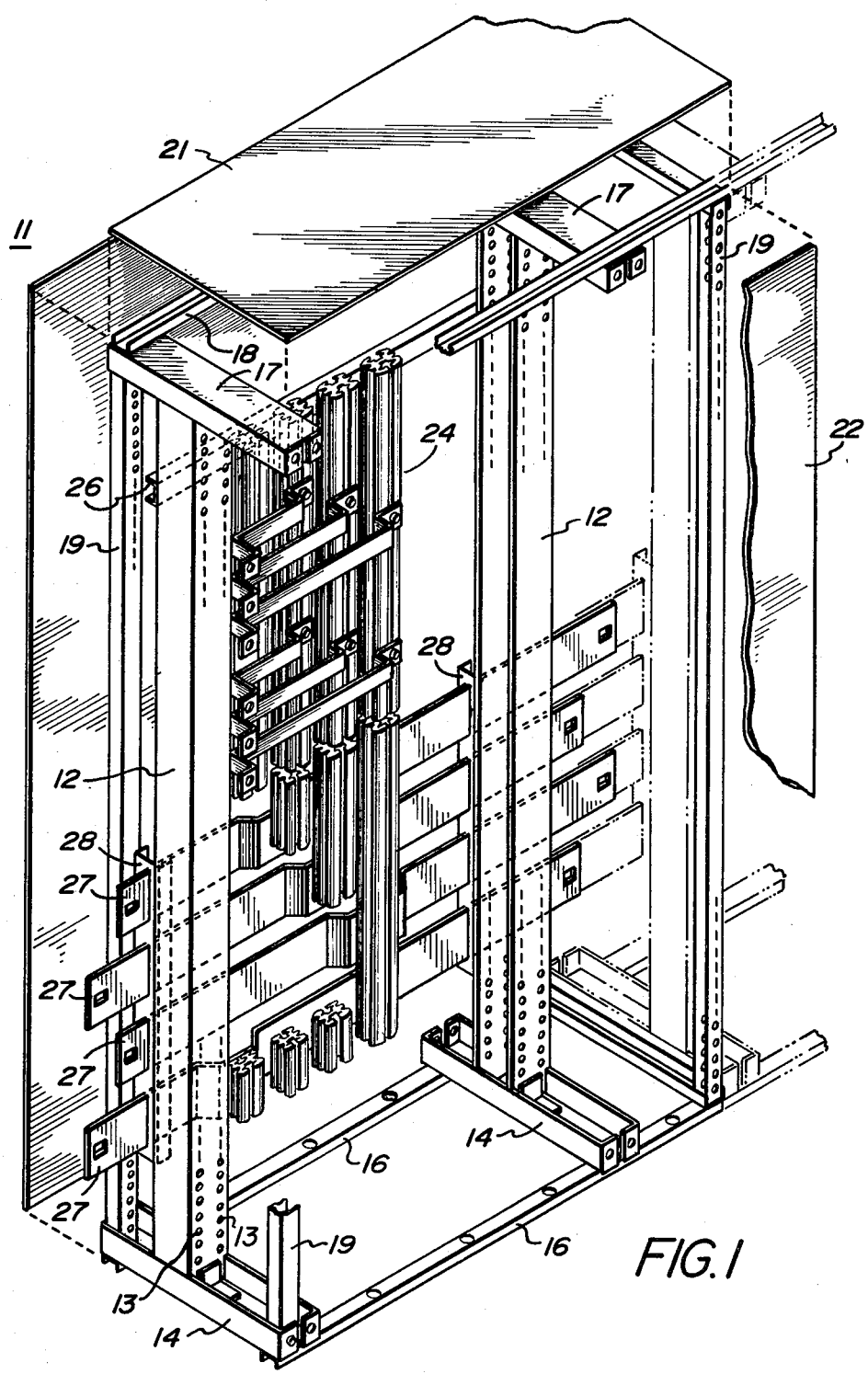
FIG. 1 is a perspective view of one embodiment of this invention.

Referring to FIG. 1, there is depicted, in a perspective view, switchboard housing apparatus 11, including a pair of vertically oriented structural support columns 12—12. Each of the columns 12—12 is provided with a plurality of openings 13—13 for carrying components thereon, such components not being shown for simplicity of illustration.

A pair of channel members 14—14 are respectively affixed to the lower extremities of the columns 13—13. A base frame 16 is coupled to the channel members 14—14 so that the columns 12—12, the members 14—14, and the frame 16 form a completely free-standing assembly.

Another pair of channel members 17—17 are respectively affixed to the upper extremities of the columns 12—12. A top frame 18 is coupled to the second pair of members 17—17. Corner posts 19—19 are coupled to the top frame 18 and to the bottom frame 16.

The corner posts can provide means for mounting covers, such as a top cover 21, via screw holes in the covers 21 and appropriate screws, not shown. The corner posts 19—19 can have a door 22 affixed to the front, back or side of the switchboard housing apparatus 11, as desired. Covers (not shown) can be affixed to various parts of the front, side, top, or bottom of the housing assembly 11.

The columns 12—12 can be affixed to the channel members 14—14 by suitable means, as by welding or by bolting.

In essence, the vertical structural support columns 12—12 are supported by top support channel members 17—17 and bottom support channel members 14—14, which act as feet to the support columns 12—12, and can be formed by sheet steel column carrying components on the front and back of the columns and prepunched through drilled openings 13 with a corner post 19—19 for attaching the nonsupporting panels and doors 22, 23, etc.

The heart of the foregoing concept is the use of the heavy vertically oriented structural support columns 12—12. A column 12 can be fabricated from sheet steel and carries all of the interior components on the front or the back of the column 12 in prepunched or drilled openings 13—13. The column 12 can then be bolted or welded as stated hereinabove into the two channels 14—14 that form feet to the columns 12—12. The channels 14—14 are normally assembled with the base channels, which form the frame 16, so that when fitted to the columns 12—12, a completely free-standing assembly is formed. The top frame 18 is similar to the base frame 16.

Vertical distribution bus bars 24—24 are supported in the assembly by bus bar supports 26—26. Horizontal bus bars 27—27 are supported by supports 28—28. Such supports will be discussed hereinafter.

The corner posts 19—19 are attached to the top and bottom frames 18, 16 and provide means for mounting the covers 21 and doors 22, 23 of the front, back, and sides, as desired. The posts 19—19 can be further used to hold barriers controlling auxiliary equipment and cable supports, as desired.

The benefits of the foregoing apparatus include the reduction of material in the overall enclosure because of concentration of support elements into one area. Further, the overall apparatus can be assembled in a simplified manner by one individual with reduced variety and number of parts in the assembly.

The identical components can be used for assembling a main switch or breaker cells with the device mounted on columns 12—12 moved to greater centers on the base frame 16.

Construction can be utilized as a pull section (not shown) without the main columns 12—12 when little weight has to be supported (for example, at the left of the leftmost column 12, as viewed in FIG. 1).

Figure 4:
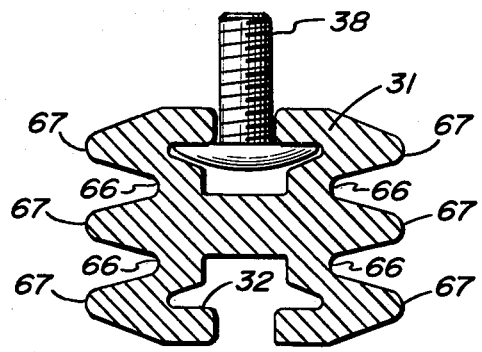
FIG. 4 is a drawing illustrating a cross-section view of a distribution bus bar and an engaging carriage bolt used in the invention.

Another aspect of the invention in the switchboard housing apparatus 11 is directed to means for supporting a bus bar. Referring to FIG. 4, a bus bar 31, which is conductive and can be formed of metal, has one or more grooves 32 therewithin for supporting a screw or a bolt. A support for such a bus bar includes an epoxy coated steel channel 33. The steel channel 33 can be coated with any other type of insulative material, including plastic; however, epoxy is desired. The epoxy coated steel channel 33 is formed with at least one bolt hole 34 therethrough. A first formed washer 36 of insulative material is adapted to seat within the hole 34 at one side of the member 33. A second formed washer 37 of insulative material is adapted to seat within the hole 34 at the opposite side of the member 33. The washers, primarily, provide mechanical protection to the epoxy from abrasion or cutting by the hardware to the bus bar. A metal bolt or screw 38 is adapted to fit within the washers 36, 37 and the hole 34 of the member 33. A nut 39 engages with the thread on the bolt 38, and the flat washer 41 is adapted to fit between the nut 38 and the washer 37 so that, upon tightening of the nut 39, the formed fiber washer 37 ensures that the epoxy on the channel 33 is not damaged. Optionally, a separate flat washer 42 and hexagon headed bolt 38A can be used in lieu of a carriage bolt 38. The washers 36 and 37, which are formed of resilient material that can conform to the epoxy coated surface of the bus bar, can be formed of fiber or plastic, as desired. In essence, this aspect of the invention involves using a fabricated steel support 33 that is coated with epoxy or other suitable insulative material and bolted by means of a bolt or a screw 38 to a distribution bus bar 31 and the central column 12 of the assembly.

At the mounting points at the various holes 34 within the steel channel 33, both for the bus bars 31—31 and the support columns 13—13, washers 36, 37 of fiber or plastic are utilized that protect the epoxy from damage either on the surface, or inside the hole 34 when bolted into place.

In accordance with this invention, a steel support is used. Steel is used because it is stronger and less expensive than plastic. However, because steel is a conductor, steel is coated with a plastic. Protective washers are utilized to avoid damage to the insulative coating on the channel 33. Protective washers are used throughout with every connection so that the insulative coating is maintained intact at all mounting points, requiring dual failure of the coating before a short circuit occurs. The plastic coating provides for electrical isolation. The plastic washers provide for mechanical protection. Otherwise, steel washers, impinged by the tightening of nuts, dig into the plastic and short circuit the equipment.

In the absence of an insulating plastic for coating the steel support, it would be necessary that there would be a one inch minimum air gap to avoid arcing for safety reasons. Such a gap is presently required by Underwriters Laboratories. However, a one inch spacing is not required in the absence of an air gap. For example, with a plastic as an insulator, one needs only 0.020 inch thickness as an insulation, thereby avoiding the necessity of the one inch space. Hence, with the foregoing invention, space is reduced by utilizing insulating material in lieu of air about the steel support.

The steel can be coated with an epoxy applied by fluidized bed process known in the art. That is, the steel is heated and placed in a bed of air bubbling epoxy. The heated steel is rocked back and forth within this bed of bubbling epoxy (which is a bubbling dry powder). The powder adheres to the steel, melts, solidifies and cures. By way of example, the epoxy becomes 0.020 inch thick, the fiber washers can be 1.5 inches in diameter, 0.030 inch thick. The hole in the center is large enough to take a ⅜ inch bolt. The washer can be formed to a minimum of 1/32 inch deflection inwards toward the hole of the metal support.

The metal support box should be constructed of hot rolled steel SAE 1010 which is ten gauge steel 0.135 inch thick.

The benefits of the foregoing aspects of this invention include:

1. The compact strength and economy of using metal instead of solid dielectric provides a better short circuit withstand resistance for a bus system than conventional methods.
2. The double insulation provided by the insulation at the ground mounting point with the member 12, and the live mounting point with the bus bar 31 or between adjacent bus bars 31—31, with the added benefit of the fiber or plastic washers 36, 37, in effect, defines that a double failure of the insulation must occur before failure of the system. In the unlikely event of a bus bar 31 overheating to the degree that insulation was totally destroyed on one bus support 33 position, the steel core within the epoxy-coated steel channel 33 would continue to hold the damaged element in place, rather than collapsing and spreading the fault as is possible with conventional systems.

Figure 2:
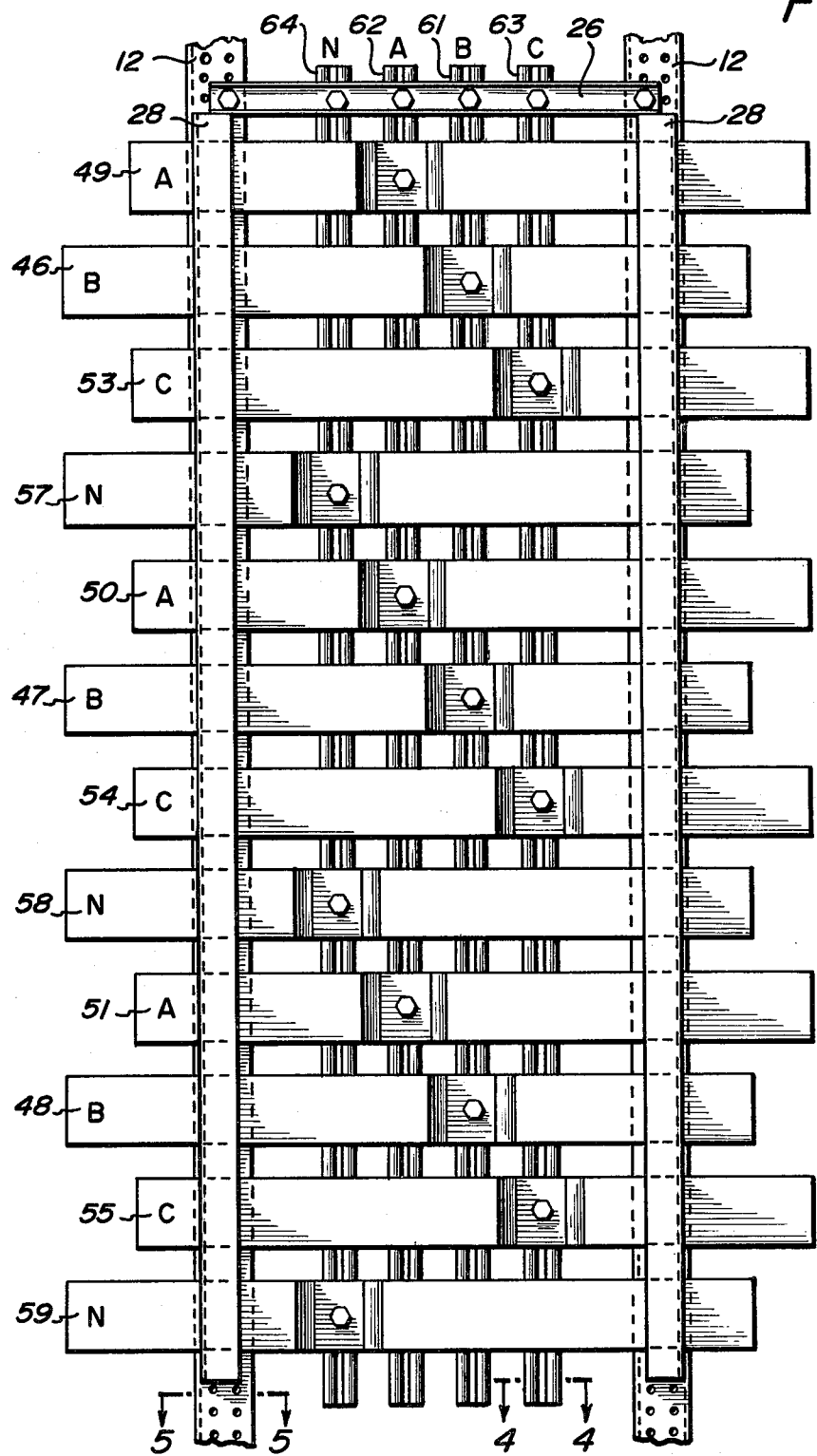
FIG. 2 is a diagram illustrating certain aspects of the invention.
Figure 3:
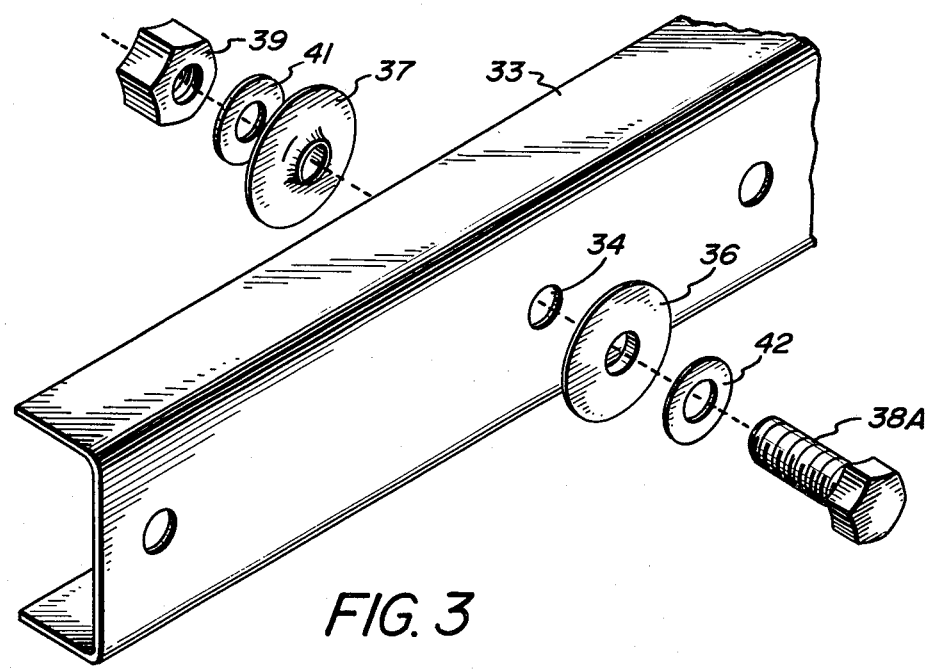
FIG. 3 is an exploded view illustrating still another aspect of the invention.

As stated hereinabove, it was common in the past to have bus bars of the same phase sandwiched together in close proximity to each other, spaced apart. However, such bars would not carry as much current as would otherwise be expected. In accordance with this invention, referring to FIG. 2, various bars are spaced away from each other laterally by a significant distance; (e.g., phase B) has a horizontal bar 49, 50, 51, and 53, 54, 55 of opposite phase or different phase at opposite sides (e.g., A phase and B phase) and the magnetic interactions among the various phases A, B, and C tend to cancel each other so that one phase does not interact adversely with a phase of an adjacent bar. The bars of like phases, such as phase B, (the bars 46, 47, 48,) are approximately 24 inches apart. Thus, with a so-called 1000 ampere bus, 2000 amperes can be carried by feeding the bus at two places. By having three lines carrying a particular phase, such as lines 46, 47, 48, in case of a short, the force exerted on any one of the lines would be approximately one-ninth the force had there been one line in lieu of three, since force is proportional to the square of the current. Referring again to FIG. 3, the distribution network further illustrates horizontal bus bars 57, 58, 59 for the N or neutral phase.

The bus bars 46, 47, 48; 49, 50, 51; 53, 54, 55; and 57, 58, 59 are all of the same configuration staggered to pick up each distribution section bus bars 61, 62, 63, and 64, respectively, with an offset of the bars or by use of a jumper bar.

The bus bars can be supported as a set of three or four (when neutral is desired) by channel or angle of glass polyester or similar material. One end of the bus bar is offset one bar thickness more than the other end to facilitate joining. Alternatively, they can be fabricated without such an offset when bus bars are used for such a connection.

For increased ratings, the assembly can be repeated up the board with the bars in parallel electrically, all tapping the same phase bar respectively.

The benefits of the foregoing aspects of this invention include:

1. Increased short-circuit capability due to the separation of the bars at each phase. This arrangement reduces forces up to nine times as stated above for a given short circuit current.
2. Simplification and reduction of cost of larger current rated assemblies due to utilization of the same bus bar and support system for various ratings. Hence, one bus bar configuration and one support configuration can be utilized instead of 28, for example.
3. The proximity effect of bus bars in the same phase is reduced, due to the widely separated bus bars, thus enabling them to be more effectively utilized. Multi-tap to the distribution bus bar enhances its rating to well in excess of the anticipated end fed bar rating.

Figure 5:
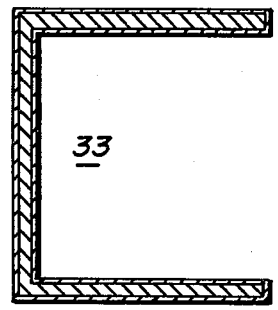
FIG. 5 is a cross-sectional view of the channel shown in FIG. 3.

Another aspect of the foregoing invention is indicated by the extrusion design of the distribution bus bar, the shape of the bus bar being shown in cross sectional view in FIG. 5. The bus bar of such a shape has an advantage of great heat dissipation and has an advantage that a bolt 38 can be slid down along one of the formed grooves 32 and extend outwardly therefrom without drilling a hole into the bar 31. The bar 31 can take either a carriage bolt or a hexagon head bolt with a flat washer. The bar 31 has great lateral rigidity because of the webs to prevent bending. It does not bend or whip around due to a short circuit condition. Another advantage of the indicated shape is that of a large surface area for cooling of the unit so that air can get into the ridges and crevices of the bar. Hence, in a sense, the outer surface of the bar 31 acts as a heat sink.

This aspect of the invention provides a convenience of mounting with either the hexagon head bolt with a washer, or a carriage bolt, together with a large surface for providing efficient cooling and rigidity in lateral bending to withstand the forces of short circuit. Furthermore, due to the symmetry of design, it is a convenient shape for extrusion and is, therefore, comparable to a flat bus in cost per pound of conductor.

The extruded shape has tapered grooves 66—66 thereby forming ridges 67—67 in each side with a ratio of approximately a 3 to 1 depth to width, with rounded top and bottom for better air flow, and to enable the extrusions to be placed at minimum air gap without the reduction of the creepage distance between live parts.

The benefits of the foregoing aspect include:
1. Ease of mounting.
2. Rigidity of shape under lateral short circuit forces.
3. High efficiency cooling fins.
4. Economical shape for extrusion.
5. Reduction of interphase spacing of conductors.

Other modifications will suggest themselves to those skilled in the art to which this invention pertains without departing from the spirit and scope of this invention.

What is claimed is:

1. Switchboard housing apparatus comprising
   A. a. a pair of vertically oriented structural support columns, each adapted to support and carry a plurality of components thereon;
      b. A first pair of channel members respectively affixed to the lower extremities of said columns;
      c. a base frame coupled to said first pair of members so that said columns, said members, and said frame form a completely free standing assembly;
      d. a second pair of channel members respectively affixed to the upper extremities of said columns;
      e. a top frame coupled to said second pair of members; and
      f. corner posts coupled to said top frame and said bottom frame;
   B. means, within said frames and corner posts, for supporting a bus bar comprising
      a. an elongated steel member having at least one bolt hole therethrough, said steel member being coated with an insulative material;
      b. a first formed washer of insulative material adapted to seat within said hole at one side of said steel member;
      c. a second formed washer of insulative material adapted to seat within said hole at a side opposite to said one side of said steel member;
      d. a metal bolt adapted to fit within said washers and said hole;
      e. a nut adapted to engage with said bolt; and
      f. a flat washer adapted to fit between said nut and said second formed washer;
   C. a bus distribution arrangement for bus bars comprising
      a. a plurality of bus bars for carrying and distributing current of a particular voltage at a first phase;
      b. a like plurality of bus bars for carrying and distributing current of said particular voltage at a second phase; and
      c. a like plurality of bus bars for carrying and distributing current at said particular voltage at a third phase,
         wherein all of said bus bars are oriented parallel to one another, and said bus bars are spaced in an interjacent manner: first phase, second phase, third phase, first phase, second phase, etc.; and
   D. a distribution bus bar having a length substantially greater than its other two rectangular coordinates, said distribution bus bar having a uniform cross section in planes containing said other two rectangular coordinates,
      a. said distribution bus bar being formed with a first groove along one side thereof extending along its length;
      b. said distribution bus bar being formed with a second groove along a second side, opposite to said first side, thereof extending along the length of said distribution bus bar;
         each of said grooves being formed so that a carriage bolt, or a hexagon head bolt with a flat washer, can be retained by said bar while permitting said bolt to be slid along its retaining groove; and
      c. the opposed sides of said distribution bus bar, interjacent said grooves, each being formed with a pair of longitudinally extending crevices and intermediate and side longitudinal ridges, whereby
         said formed crevices and formed ridges provide for great rigidity of said distribution bus bar during a short circuit condition, while providing for a convenient shape to manufacture by way of extrusion, while further providing for an efficient heat sink.

* * * * *